United States Patent [19]
Walling

[11] Patent Number: 6,056,450
[45] Date of Patent: May 2, 2000

[54] CAMERA SUPPORT DEVICE WITH TELESCOPING POLE AND MONITOR

[76] Inventor: Dannis R. Walling, 5622 Village Park Dr., Katy, Tex. 77493

[21] Appl. No.: 09/266,636

[22] Filed: Mar. 11, 1999

[51] Int. Cl.[7] .................................................. G03B 17/00
[52] U.S. Cl. ........................................... 396/428; 352/243
[58] Field of Search .................................... 396/419, 427, 396/428; 352/243; 348/84, 85, 143, 157

[56] References Cited

U.S. PATENT DOCUMENTS

| | | |
|---|---|---|
| 4,051,525 | 9/1977 | Kelly . |
| 4,474,439 | 10/1984 | Brown . |
| 5,065,249 | 11/1991 | Horn . |
| 5,220,848 | 6/1993 | Basilico . |
| 5,742,859 | 4/1998 | Acker . |
| 5,767,905 | 6/1998 | Archambo . |

OTHER PUBLICATIONS

Chapman/Leonard Studio Equipment brochure, "The Pedolly", copyright 1994.

*Primary Examiner*—Howard B. Blankenship
*Attorney, Agent, or Firm*—Felsman, Bradley, Vaden Gunter & Dillon LLP; Frank S. Vaden III

[57] ABSTRACT

A camera support device for elevating a camera above its operator. The device provides a stable support and allows the operator to manually control the camera's field of view. The device comprises a support base, a rotatable telescoping pole and a tiltable camera mount at the top of the pole that may be manually controlled. The tilt control of the camera mount is preferably provided by a spring lever which biases the camera platform to rotate forward. A cable is attached to the camera mount and is used to apply resistance to the spring lever and to rotate the camera backwards. The lower end of the cable is attached to a control arm connected to the pole at a location that is accessible by the operator. The camera's field of view may be manually raised or lowered by lowering or raising the control wire respectively. In addition, the camera may be manually panned left or right by rotating the pole accordingly.

The use of manual control over the camera's field of view is often preferable to the use of motor controls, and particularly, where the camera and support device are to be used to film or record events over a large area, a significant distance from the camera.

17 Claims, 5 Drawing Sheets

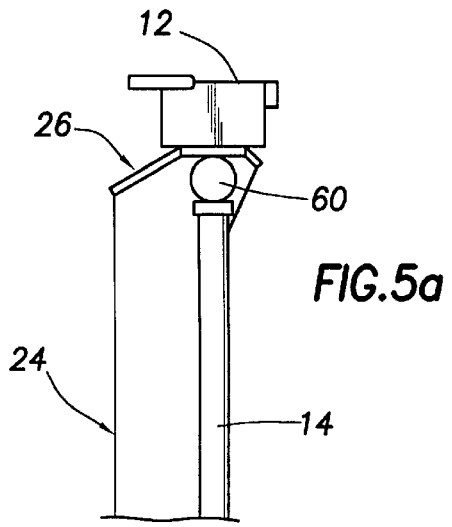
FIG.5a
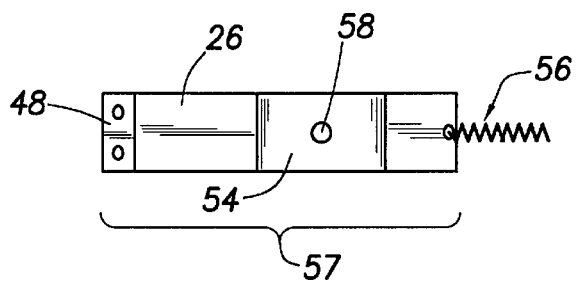
FIG.5b
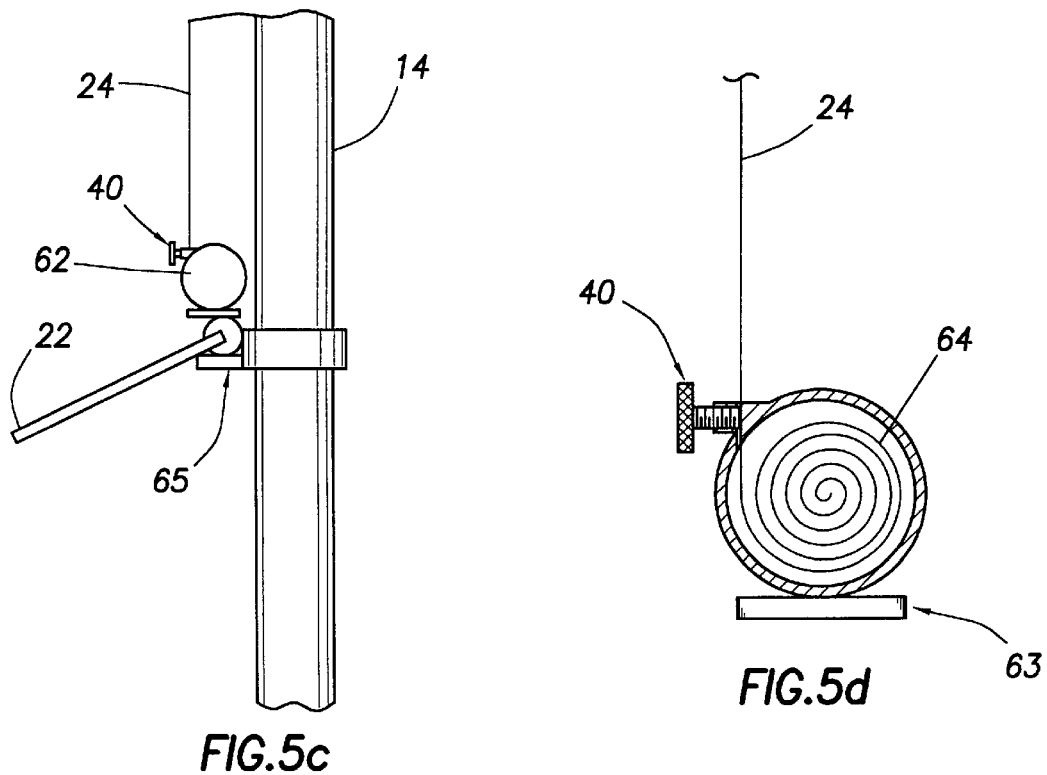
FIG.5c
FIG.5d

CAMERA SUPPORT DEVICE WITH TELESCOPING POLE AND MONITOR

BACKGROUND OF THE INVENTION

1. Field of the Invention

This invention pertains to a support system for a video camera that enables the camera to be remotely operated, and more specifically, that allows the operator to manually change the field of view of a camera that is beyond the operator's reach. The invention is particularly designed for elevating a video camera to a significant height above the operator to enable the recording of events over greater distances from the operator.

2. Description of the Prior Art

The use of remote cameras is well known in the art particularly for use in applications where an operator cannot accompany the camera because of the nature of the environment in which the camera is to be used or because of safety concerns within those environments. Further, it is common to use remote cameras for surveillance purposes in monitoring retail businesses, banks, parking lots and other areas to deter criminal activity and record it should it occur. Further still, the television and motion picture industries use remote controlled cameras to improve the recording of events and the filming of scenes from new and interesting perspectives.

The present invention was borne from the need for an inexpensive, simple camera support device that would allow a single person to elevate and operate a video camera at a substantial height so as to record action-oriented events occurring a significant distance from the camera.

Solving a different need, U.S. Pat. No. 5,767,905 issued to Archambo, discloses a system that is mounted to the arm of a wheel chair to enable a handicapped person to view events that might otherwise be blocked from the person's view by other persons standing around the chair. The system disclosed in the '905 patent consists of a camera mounted on a telescoping arm, a video monitor mounted to the arm of the chair for viewing the camera's field of view, and a motor and control switch for controlling the rotation of the telescoping arm. The described device does not anticipate or suggest that the camera should be elevated more than a few feet above the chair to permit the chair occupant to "see" over those standing around the chair. In addition, the device fails to anticipate a need for tilting the camera relative to the telescoping arm. A further disadvantage of the system described in the '905 patent is the fact that it is dependent on motorized control to pan the camera. It has been found that motorized control over the rotation or panning of the camera does not provide sufficient sensitivity to enable an operator to direct the field of view at a subject that is more than a few yards from the camera lens or a subject that is rapidly moving and changing directions. Therefore, it has been determined that manual control over the pan and tilt features of the camera is preferred particularly when recording events and activities more than a few yards from the camera.

U.S. Pat. No. 5,742,859 issued to Acker discloses a camera support and stabilizing device that attempts to isolate the camera from the movements of the operator. The device consists of a camera mounting platform attached to a pivot having a counter balance to maintain the camera in a horizontal position. The device also includes a video monitor and handle adjacent to the platform. The handle is provided for panning and tilting the camera. However, as particularly illustrated in FIG. 14 of the '859 patent, the operator of a camera mounted to such a device would be unable to control the panning and tilting of the camera when the device is elevated beyond the operator's reach. In fact, the presence of the counterbalance prevents the camera from being tilted when the operator cannot reach the handle. An additional disadvantage in the '859 system occurs because the video monitor is mounted adjacent the video camera such that when the device is elevated above the operator, the operator's view of the monitor is significantly diminished.

U.S. Pat. No. 5,065,249 issued to Horn et al. discloses a device that enables a camera operator to elevate the camera above a crowd to get a clear view of the event or activity to be recorded. The device consists of a foldable pole, a camera mounted at the upper end of the pole, a motor for tilting the camera relative to the pole and a video monitor mounted to the pole at a location accessible to the operator. The device lacks a base or other structure that would assist the operator in holding the pole in a stable upright position, and thus, at least one of the operator's hands must be used to grip the pole and hold it upright. Further, the device uses a motor to tilt the camera relative to the pole. As noted above, it is preferable to manually pan and tilt a camera when recording or filming events that are occurring over a significant distance from the camera and/or recording a subject that is fast-paced requiring more responsive control over the camera's field of view.

Therefore, it is an object of the present invention to provide a camera support specifically designed for a camera to enable the recording of events that are occurring a significant distance from the camera and/or which are action-oriented in nature.

It is an object of the present invention to provide an extendible, mobile, manually operated camera and monitor support system that overcomes the aforementioned problems.

It is another object of the present invention to provide an extendible, mobile, manually operated camera and monitor support system which can be fully controlled by a single operator.

It is a further object of the present invention to provide an extendible, mobile, manually operated camera and support system which includes a camera at the remote end, a mobile base at the other and a monitor and camera controls at a location accessible by the operator, such that an operator can monitor and closely control the field of view of the remote camera.

It is a further object of the present invention to provide an extendible, mobile, manually operated camera and monitor support system which includes an extendible camera mount which can be collapsed into a compact unit for storage.

It is a further object of the present invention to provide an extendible, mobile, manually operated camera and monitor support system which is simple and inexpensive to manufacture, maintain and operate.

SUMMARY OF THE INVENTION

The camera support device of the present invention is particularly designed for use in filming or recording events that are occurring a significant distance from the camera and/or are action-oriented in nature, in particular, sporting activities such as football and soccer. The support device includes a telescoping pole that has a base and means within the base to facilitate the rotation of the pole about its vertical axis. A camera mount is connected to the upper end of the pole to which a camera may be secured and elevated a substantial height distance above the base. Means are provided for rotating the camera mount relative to the horizon so that a camera on the mount may be tilted to raise or lower its field of view. At an accessible location above the base, a control arm or control handle is attached to the pole that can be used to manually rotate the pole about its vertical axis, thereby panning a camera on the mount. Similarly, the control arm is connected to the camera mount to provide manual control over the tilting of the camera. Also at an accessible location above the base, a monitor is attached to the pole to enable the operator to monitor the camera's field of view and to make necessary adjustments to follow the action.

Optionally, the base of the support may be provided with wheels and/or a handle to facilitate moving the device. The control arm of the device may be attached to the camera mount by wire, cable or strap to control the tilt of the camera. A housing may be attached to the pole to retractably contain this tilt control cable or strap. Further the control arm and telescoping pole may be provided with locking mechanisms that can be locked to prevent panning and/or tilting of the camera when a desired field of view is found.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary preferred embodiments thereof which are illustrated in the appended drawings, which form a part of this specification. It is to be noted, however, that the drawings illustrate only typical preferred embodiments of the invention and are therefore not to be considered limiting of its scope as the invention may admit to other equally effective embodiments.

In the drawings:

FIG. 1b is the opposite side view of the device shown in FIG. 1a.

FIG. 4b is a rear view of the upper end of the telescoping pole with the camera platform of FIG. 4a.

FIG. 5a is a side view of the upper end of the telescoping pole and camera mount in an alternative embodiment.

FIG. 5b is an enlarged overview of an alternative embodiment of the camera mount.

FIG. 5c is a side view of the control arm and telescoping pole in an alternative embodiment.

FIG. 5d is an enlarged side view of the spring loaded housing for the tilt control strap shown in FIG. 5c.

DESCRIPTION OF THE PREFERRED EMBODIMENTS

Figure 1A:
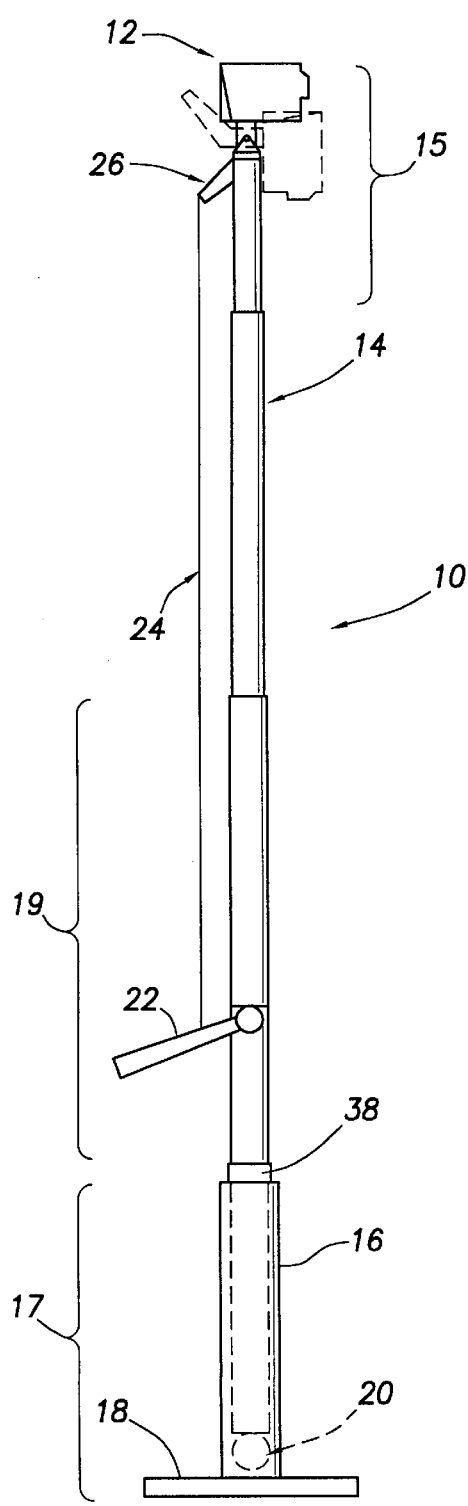
FIG. 1a is a side view of the present invention showing the telescoping pole in an extended position and a video camera shown in solid in a first horizontal position and in outline in a second downward tilted position.
Figure 1B:
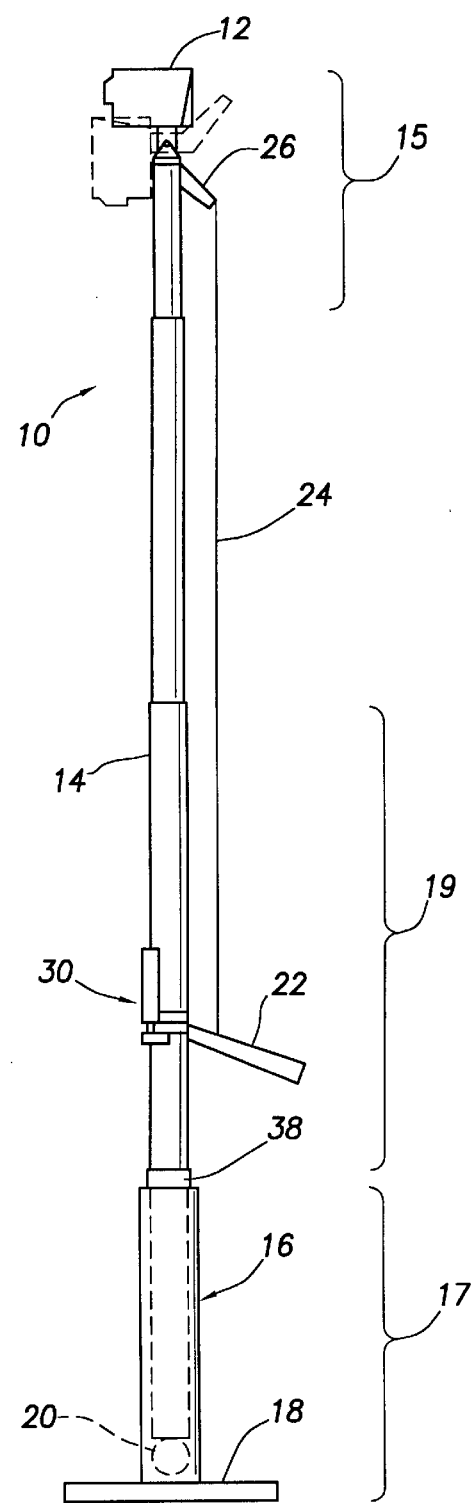

The camera support device 10 of the present invention is shown generally in FIGS. 1a and 1b. Device 10 is shown as comprising of support base 17, telescoping pole 14 rotatably resting within base 17, camera 12 mounted to a camera mount that may be manually tilted relative to the pole, camera monitor 30 for monitoring the camera's field of view and control arm 22 for controlling the camera's field of view.

Support base 17 includes several elements that all rest on base plate 18. Base plate 18 supports device 10, and thus, should be capable of supporting the weight of the device and should provide stability particularly when the device is extended. As such, base plate 18 may be made of a variety of metals and composite materials. However, it is preferred that the base plate be made of a high grade steel that will provide both strength and support to the device and will serve to lower the center of gravity when the device is in its extended configuration.

Attached to base plate 18 and perpendicular thereto is panning tube 16. Panning tube 16 is attached to base plate 18 by welding or similar method. It is anticipated that panning tube 16 and base plate 18 will be made of the same or similar materials.

Bearing or bearing assembly 20 is located internally in the lower portion of panning tube 16. The lower most section of telescoping pole 14 has a slightly smaller diameter than the diameter of panning tube 16 to allow the telescoping pole to reside within the panning tube and rest on or within bearing assembly 20. In this configuration, the telescoping pole is fully supported by the internal surfaces of the panning tube and may be rotated on or within the bearing assembly as desired.

Figures 3A, 3B:
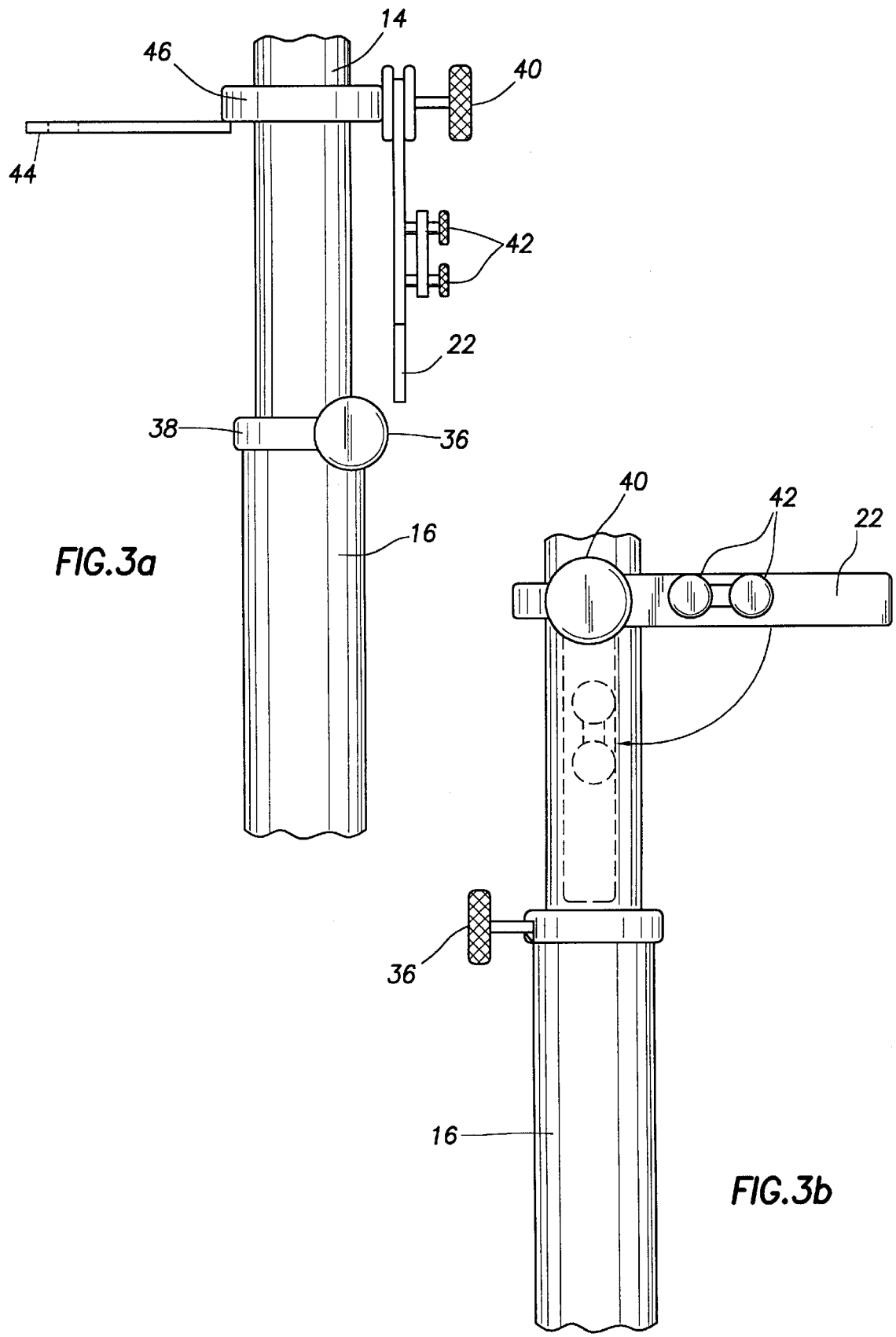
FIG. 3a is an enlarged rear view of a portion of the present invention above the base where the control arm and video monitoring bracket are located on the telescoping pole.
FIG. 3b is an enlarged side view of a portion of the present invention above the base showing the control arm in solid in a first raised position and in outline in a second lowered position.

Optionally attached to the upper portion of panning tube 16 is split collar 38 with threaded locking knob 36, as illustrated in FIGS. 3a and 3b. The split collar and locking knob may be tightened down onto the telescoping pole to prevent the rotation of the pole when desired. It is anticipated that alternative clamping devices can be attached to panning tube 16 or base 17 to prevent rotation of the telescoping pole.

Figure 2:
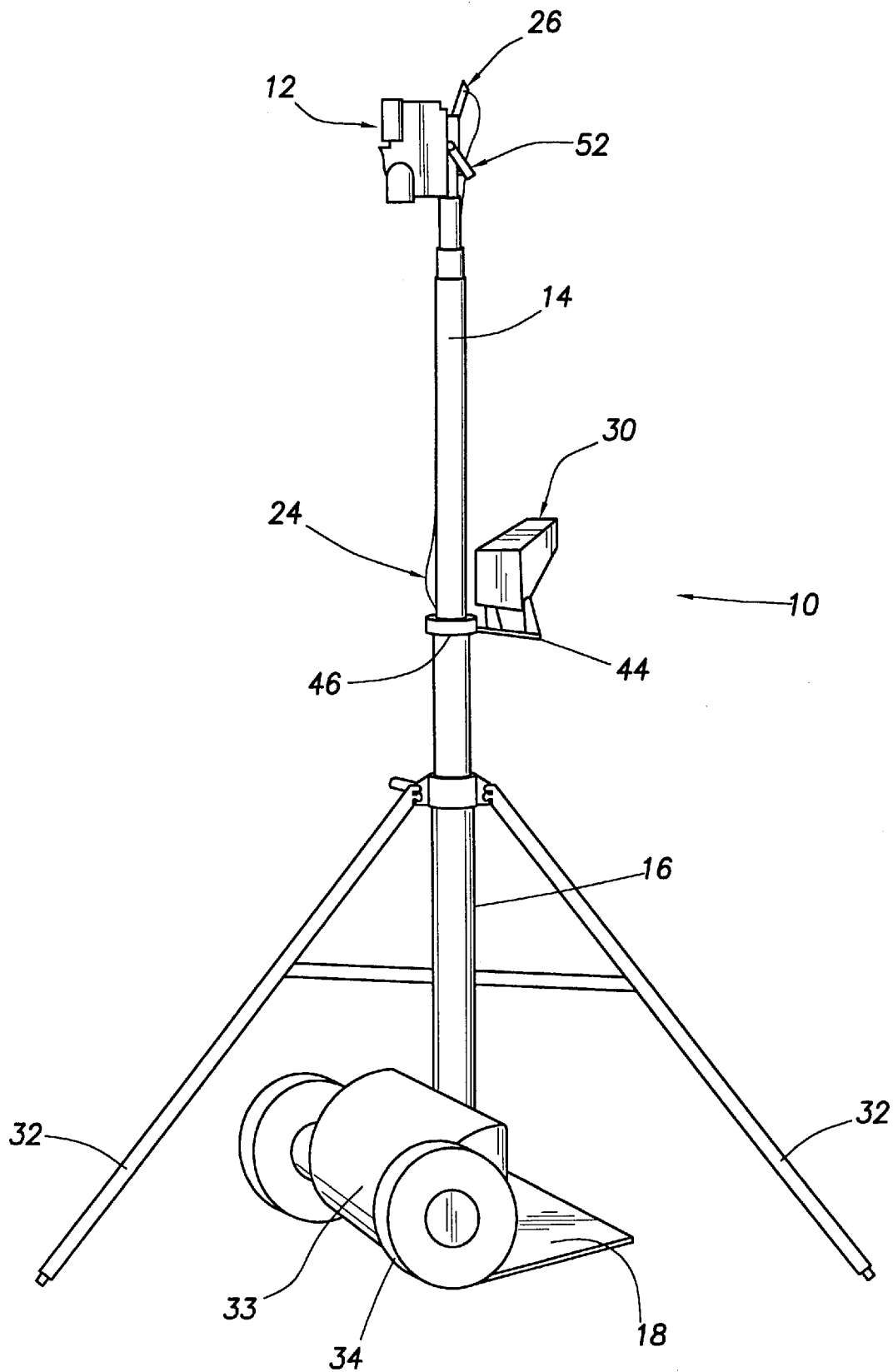
FIG. 2 is a perspective view of the device of the present invention showing the telescoping pole in a semi-collapsed or nested position.

As shown in FIG. 2, base 17 may optionally include two or more wheels 34 to facilitate the movement and transport of the support device. Also illustrated is closable compartment 33 that rests on and is preferably fixed to base 17. Compartment 33 may be used to hold battery packs, film and/or video cassette tapes as well as providing storage for the camera or cameras when not in use. Optional support members 32 are illustrated as being attached to the upper portion of panning tube 16. Support members 32 are preferably three or more support legs that may be extended from the panning tube to stabilize the device when the telescoping pole is extended. It is anticipated that alternative means may be used to stabilize the device when the pole is extended.

In FIGS. 1a and 1b, telescoping pole 14 is shown as having accessible region 19 and upper region 15. Region 19 is the region of the telescoping pole immediately above panning tube 16 and extending to about six or seven feet above base plate 18. It is this portion of the pole that is immediately accessible by the operator and in which it is preferable to locate control arm 22 and monitor 30. Various embodiments of these elements are shown in more detail in FIGS. 3a–3b and in FIG. 5c. Upper region 15 represents the upper most region of telescoping pole 14 where the camera mount and tilt mechanism are attached to the pole. Various embodiments of these elements are shown in more detail in FIGS. 4a–4c and in FIG. 5a.

Pole 14 is made of a lightweight high strength material such aluminum or a composite plastic. Alternative materials may be used provided they have sufficient strength and do not add substantial weight to the pole that would render the pole unstable when extended. The pole is discussed herein as being telescoping in nature, but it is also anticipated that other designs may be used provided that the assembly and/or extension of the pole is simple and may be accomplished quickly with minimal labor. In its fully extended configuration, it is anticipated that the pole will have a height of about fifteen to about twenty five feet. For purposes of filming or recording athletic events such as football games and scrimmages, it has been found that a maximum height of about twenty feet is preferable in providing sufficient height and good stability. In its nested configuration as shown in FIG. 2, it is preferable that the pole should have a height of about six to about eight feet to facilitate transport and storage of the device.

FIG. 2 shows device 10 and telescoping pole 14 in its nested configuration, but with support members 32 in their extended positions. Monitor 30 is clamped to the telescoping pole in accessible region 19 while a video recorder is shown as being attached to the camera mount at the top of upper region 15. Tilt control cable 24 is partially shown as being slack due to the nested configuration. Further, camera mount elements tilt arm 26 and spring lever 52 are both illustrated.

The elements that control the tilting action of the camera are shown in more detail in FIGS. 3a and 3b. These elements are designed to simplify the use of the support device as well as to maximize the flexibility of the device for use by different persons. For instance, split collar 46 is clamped to one of the lower sections of tubing of telescoping pole 14 within accessible region 19 such that control arm 22 and monitor bracket 44 may be raised or lowered to accommodate persons of different heights. Likewise, cable lock knobs 42 allow the operator to attach the control cable (not shown) and control the tilt action of the camera simply by raising or lowering control handle 22. Control handle 22 also controls the panning action of the camera by rotating pole 14 within panning tube 16 such the manual pan and tilt of the camera are responsively controlled from a single handle.

Figure 4A:
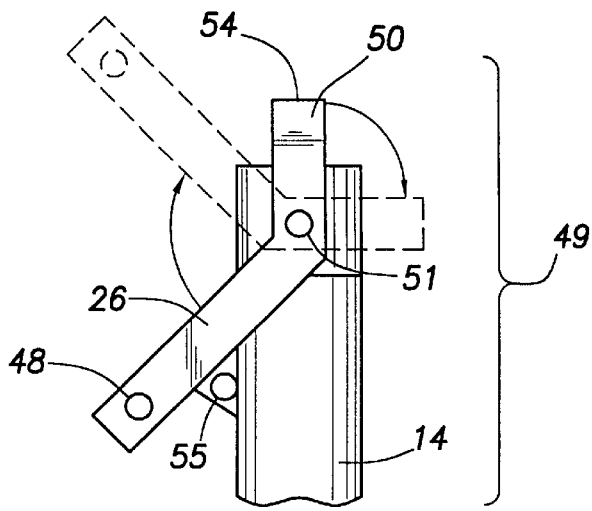
FIG. 4a is a side view of the upper end of the telescoping pole with the camera platform shown in solid in a level position and shown in outline in a forward tilted position.
Figure 4B:
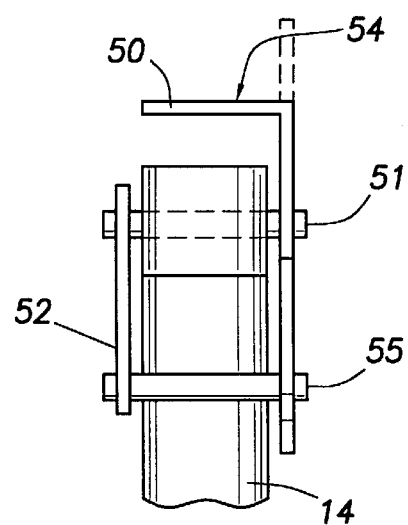
Figure 4C:
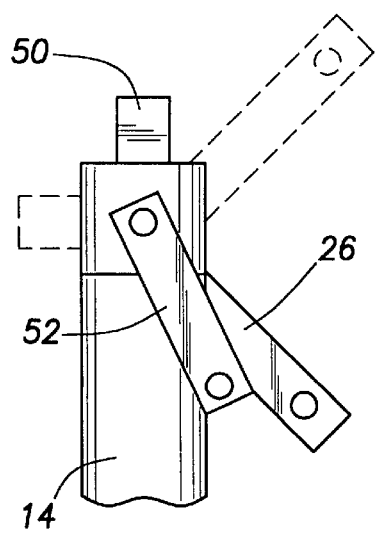
FIG. 4c is the opposite side view of the upper end of the telescoping pole illustrated in FIG. 4a with the camera platform shown in solid in a level position and shown in outline in a forward tilted position.

FIGS. 4a–4c show different perspectives of upper region 15 and, in particular, camera mount 49. Camera mount 49 preferably includes spring lever 52 that is secured against the telescoping pole between coil 51 and tilt stop 54. Coil 51 passes through pole 14 and is continuous with tilt head 50 on the opposite side of the pole from spring lever 52.

Tilt head 50 consists of tilt arm 26 and camera platform 54. Tilt arm 26 has means for attaching control wire 24. This attachment means can have a variety of structures, but a simple opening in tilt arm 26 such as cable attachment 48 is preferred. In addition, tilt head 50 forms an obtuse angle between tilt arm 26 and its vertical portion shown in FIG. 4a, intermediate between tilt arm 26 and camera platform 54. Device 10 is designed to support a variety of commercially available cameras and video recorders. Most cameras and recorders are provided with means for attaching the camera to a tripod or similar support device and camera platform 54 will be provided with complementary or mating structure. As threaded connections are believed to be the more common type of connection on cameras, it is preferable that camera platform 54 will have a threaded connection for securing a camera to the platform.

Spring lever 52 and coil 51 bias tilt head 50 in a forward or clockwise direction as indicated by the arrows in FIG. 4a. A camera mounted to camera platform 54 is thus caused to rotate forward with tilt head 50 causing the camera's field of view to tilt downward. To raise the camera's field of view, the operator pulls down on control wire 24 which in turn pulls tilt arm 26 down against the spring force of coil 51. As a result, the tilt head and camera rotate counter-clockwise raising the camera's field of view. Tilt stop 55 serves to prevent the tilt head from rotating beyond a preset point. Although FIGS. 5a–5c illustrate that the camera's field of view will not be raised above horizontal, it is anticipated that the support device will allow the camera's field of view to be raised above a horizontal position. This feature may be achieved by either decreasing the obtuse angle between tilt arm 26 and the vertical portion of tilt head 50 or by relocating tilt stop 55 at a location closer to the vertical axis of pole 14.

To prepare the support device for operation, camera 12 is connected to camera platform 54 and the appropriate electrical connections are secured. Before extending pole 14 to the desired height, control wire 24 is fixed to cable attachment 48. Control wire 24 may be the insulated electrical cable used to communicate the video signal to monitor 30 or it may be a separate wire, cable or strap used exclusively for manually controlling the tilt of camera 12. Control arm 22 and monitor 30 are raised or lowered to accommodate the height of the operator and fixed to pole 14 at a comfortable level by split collar 46. Once the pole is extended to its desired height and split collar 46 is tightened, control cable 24 is pulled down tight to remove all slack and is then tied around lock knobs 42 on control handle 22. Monitor 30 is connected to monitor bracket 44 and the electrical connections for the monitor are secured.

Control arm 22 is attached to the side of telescoping pole 14 through tilt lock knob 40. In operation, control arm 22 provides manual control over the panning and tilting actions of the camera some fifteen to twenty five feet above. Control arm 22 is fixed to the side of pole 14 and is used to manually rotate the pole. The rotation of pole 14 provides the panning action on the camera mounted at the top of the pole.

In addition, and as indicated by the arrow in FIG. 3b, control arm 22 may be rotated about lock knob 40. When there is no resistance, tilt head 50 is rotated forward under the influence of coil 51 and a camera mounted thereto is caused to tilt downward. Resistance to coil 51 may be provided with control arm 22 through control wire 24 and tilt arm 26. More specifically, when control arm 22 is rotated down, control wire 24 is pulled down as is tilt arm 26 of tilt head 50. This action causes tilt head 50 to rotate backwards against the spring force of coil 51 and raises the field of view of a camera mounted on platform 54. If control arm 22 is raised, coil 51 causes the tilt head to rotate forward lowering the camera's field of view.

If a desirable field of view is found, tilt lock knob 40 and pan lock knob 36 may be tightened to prevent rotation of control arm 22 and pole 14, respectively. Alternative means for preventing the rotation of these elements are available and are believed to be within the scope of this disclosure.

In an alternative embodiment shown in FIGS. 5a–5d, control cable 24 is retained in cylindrical housing 62. The camera is mounted to the telescoping pole in the upper region of the pole and attached to the pole on tilt head 60. Tilt head 60 allows a camera mount fixed thereto to be rotated relative to pole 14 enabling the operator to raise or lower the camera's field of view. The camera is mounted to tilt head 60 by camera mount 57. Camera mount 57 includes spring 56 that connects the mount to pole 14 and biases it in a forward direction. Camera mount 57 also includes tilt arm 26 for controlling the rotation of the tilt head, camera platform 54 for mating with the camera, and cable attachment 48 for attaching control wire 24. Again, the camera platform will be provided with means for mating with the camera and tilt head 60. As shown in FIG. 5b, this mating means may simply be opening 58 that allows the camera to be mounted to the tilt head through camera mount 57.

Control wire 24 is shown in FIGS. 5a, 5c and 5d as a strap that is retractably contained within cylindrical housing 62. As shown in FIG. 5d, cylindrical housing 62 is not unlike a housing for a retractable measuring tape, contains the strap coiled about spring mechanism 64. In operation, strap 24 is attached to the tilt arm 26 of camera mount 57. As the pole is telescoped or otherwise elevated, the strap feeds out of cylindrical housing 62. Once the pole is raised to the desired height, lock knob 40 on the cylindrical housing is tightened to prevent additional strap from feeding from the cylindrical housing.

Cylindrical housing 62 is releasably mounted to control arm 22 on quick release plate 63. Quick release plate 63 is mounted to tilt head 65 which is mounted to pole 14. Rotation of tilt head 65 is controlled by handle 22 attached thereto. Tilt heads 60 and 65 are preferably tripod-style tilt heads that may be acquired from Bogen Photo Corporation of Ramsey, N.J.

When cylindrical housing 62 and tilt arm 26 are connected via strap 24 and lock knob 40 is tightened, the operator may control the tilt action of the camera by merely raising or lowering handle 22. The use of cylindrical housing 62 simplifies the use of the device by eliminating excess wire or cable that would otherwise be present when control wire 24 has slack and/or is not drawn tight between tilt arm 26 and handle 22.

By providing manual control over the pan and tilting actions of the camera, the present invention provides more precise or responsive control over the movements of the camera than are possible with motorized controls. The precision of movement and the sensitivity of the controls become more critical as the camera's distance from the subject increases. Furthermore, the action in a fast-paced sporting event characterized by rapid movement and frequent direction changes may not be satisfactorily recorded where the camera's field of view is under motorized control. Therefore, the camera support device of the present invention provides the user with a higher degree of control over the camera's field of view than was previously available.

From the foregoing it will be seen that this invention is one well adapted to attain all of the ends and objects herein above set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A support device for elevating and manually directing a camera, the support device comprising:

a vertically extensible pole having a base and means for rotating the pole about its vertical axis;

a camera mount connected to the pole at the end opposite the base, the camera mount having means for rotating it about a horizontal axis for tilting a camera attached to the mount;

a control arm attached to the pole above the base and connected to the camera mount for manually controlling the rotation of the pole and the rotation of the camera mount; and a camera monitor attached to the pole and electrically connectable to a camera attached to the camera mount enabling a camera operator to monitor the camera's perspective.

2. The support device of claim 1, wherein the means for rotating the pole about its vertical axis is a vertical panning tube and bearing attached to the base.

3. The support device of claim 1, further comprising a tilt control cable connecting the control arm to the camera mount such that when the control arm is moved in a first direction the camera mount rotates in a first direction, and when the control arm is moved in the reverse direction the tilt control cable rotates the camera mount in the opposite direction.

4. The support device of claim 3, further comprising a housing attached to the pole for retractably containing the control cable, the housing having means for preventing the advancement of cable from the housing and a spring mechanism to retain the cable within the housing.

5. The support device of claim 1, wherein the means for rotating the camera mount about a horizontal axis is a spring lever connected to the pole adjacent the camera mount, the spring lever biasing the camera mount to rotate in a first direction.

6. The support device of claim 5, wherein the camera mount has a tilt stop that prevents a camera attached to the mount from being rotated past a horizontal position when the control arm is moved in the reverse direction.

7. The support device of claim 1, wherein the means for rotating the camera mount about a horizontal axis comprises a tilt head rotatably connecting the camera mount to the pole and a spring interconnecting the pole and camera mount such that the spring biases the camera mount to rotate in a first direction.

8. The support device of claim 1, wherein the control arm is attached to the pole between three and six feet above the base.

9. The support device of claim 1, wherein the control arm is pivotally attached to the pole.

10. The support device of claim 1, wherein the camera mount is at least fifteen feet above the base when the pole is fully extended.

11. The support device of claim 1, further comprising a plurality of legs connected to the pole that may be extended to stabilize the device when the pole is extended.

12. The support device of claim 2, further comprising a plurality of legs connected to the upper end of the vertical panning tube that may be extended to stabilize the device when the pole is extended.

13. The support device of claim 1, further comprising a plurality of wheels attached to the base to facilitate movement of the device.

14. The support device of claim 1, further comprising means for preventing rotation of the pole about its vertical axis.

15. The support device of claim 1, further comprising means for preventing rotation of the camera mount about its horizontal axis.

16. The support device of claim 14, wherein the means for preventing rotation of the pole is a split collar attached to the upper end of the panning tube that may be tightened to fasten the pole to the base.

17. The support device of claim 15, wherein the means for preventing rotation of the camera mount is a lock to prevent movement of the control arm.

* * * * *